(12) United States Patent
Tanaka et al.

(10) Patent No.: US 8,937,416 B2
(45) Date of Patent: Jan. 20, 2015

(54) AUTOMOTIVE DYNAMOELECTRIC MACHINE WITH A PROTECTIVE COVER FOR VOLTAGE REGULATOR AND RECTIFIER ELEMENTS

(75) Inventors: Kazunori Tanaka, Tokyo (JP);
Toshiyuki Oonishi, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 245 days.

(21) Appl. No.: 13/041,909

(22) Filed: Mar. 7, 2011

(65) Prior Publication Data

US 2012/0104887 A1    May 3, 2012

(30) Foreign Application Priority Data

Oct. 27, 2010  (JP) ................................ 2010-240598

(51) Int. Cl.
*H02K 5/00* (2006.01)
*H02K 11/00* (2006.01)
*H02K 5/08* (2006.01)
*H02K 11/04* (2006.01)
*H02K 19/36* (2006.01)

(52) U.S. Cl.
CPC ............... *H02K 5/08* (2013.01); *H02K 11/046* (2013.01); *H02K 19/36* (2013.01)
USPC .......................... 310/89; 310/68 D; 310/400

(58) Field of Classification Search
CPC .................................. H02K 5/15; H02K 5/26
USPC ........... 310/88, 89, 156.66–156.73, 257, 263
See application file for complete search history.

(56) References Cited

U.S. PATENT DOCUMENTS 5,650,676 A * 7/1997 Blumenberg ................... 310/88
6,373,166 B1 * 4/2002 Asao et al. .................... 310/263

FOREIGN PATENT DOCUMENTS

| DE | 1297329 A | 6/1971 | |
|---|---|---|---|
| DE | 218504 A1 | 2/1985 | |
| JP | 07-336974 A | 12/1995 | |
| JP | 2002095215 A * | 3/2002 | ............... H02K 9/02 |
| KR | 2003-0072659 A | 9/2003 | |

OTHER PUBLICATIONS

Machine Translation, JP 2002095215 A, Mar. 29, 2002.*
Machine Translation, JP 07336974 A, Dec. 22, 1995.*
Japanese Office Action dated Aug. 21, 2012 issued in Japanese Patent Application No. 2010-240598.
German Office Action dated May 12, 2014 issued in corresponding German Patent Application No. 102011085079.1.

* cited by examiner

*Primary Examiner* — Quyen Leung
*Assistant Examiner* — Thomas Truong
(74) *Attorney, Agent, or Firm* — Sughrue Mion, PLLC

(57) ABSTRACT

A resin protective cover is prepared so as to have a cup shape that is constituted by a floor portion and a tubular peripheral wall portion, and that can be mounted to a rear bracket so as to cover a rectifying apparatus and a voltage regulator that are disposed axially outside the rear bracket. The protective cover includes an engaging hook that includes: a shank portion that is disposed so as to extend from an opening end of the peripheral wall portion; and a hook portion that is disposed so as to project radially outward from a tip end of the shank portion, and the protective cover is held on the rear bracket elastically in an engaged state by the engaging hook being inserted into an engaging aperture that is formed on a casing.

2 Claims, 4 Drawing Sheets

AUTOMOTIVE DYNAMOELECTRIC MACHINE WITH A PROTECTIVE COVER FOR VOLTAGE REGULATOR AND RECTIFIER ELEMENTS

BACKGROUND OF THE INVENTION

1. Field of the Invention

The present invention relates to an automotive dynamoelectric machine such as an automotive alternator, etc., and particularly relates to a construction for mounting a protective cover that protects a rectifying apparatus and a voltage regulator that are supported by a casing.

2. Description of the Related Art

In conventional automotive alternators, a rectifying apparatus and a voltage regulator are mounted to an outer end surface of a rear bracket, and a floored cylindrical protective cover is mounted to the rear bracket from axially outside so as to cover the rectifying apparatus and the voltage regulator. The protective cover is supported on the rear bracket by engagement between hook portions of engaging hooks and engaging apertures by inserting engaging hooks that are disposed so as to extend axially from peripheral wall portions of the floored cylindrical shape into engaging apertures that have been recessed into an outer peripheral edge portion of the rear bracket (see Patent Literature 1, for example).

Patent Literature 1: Korean Patent Application Publication No. 2003-72659 (Specification)

In protective covers according to conventional automotive alternators, the hook portions are disposed so as to project inward from tip ends of shank portions of the engaging hooks. Here, the hook portions are inserted into the engaging apertures so as to slide on inner wall surfaces of the engaging apertures while elastically deforming the shank portions radially outward. Then, when the hook portions pass through the engaging apertures, the shank portions return to their original state, the hook portions are engaged by the rear bracket, and the protective cover is held by the rear bracket.

Thus, because it is necessary to elastically deform the shank portions radially outward using some kind of tool to release engagement of the hook portions from the rear bracket, one problem in conventional automotive alternators has been that work to remove the protective cover from the rear bracket is complicated, making mounting and removal workability poor.

Because the hook portions slide on portions of the inner wall surfaces of the engaging apertures that face radially outward from the rear bracket during mounting and removal of the protective cover, another problem has been that it is necessary to form the engaging apertures so as to have aperture shapes that protrude radially outward from the cylindrical portion of the protective cover, giving rise to increases in diameter of the rear bracket.

SUMMARY OF THE INVENTION

The present invention aims to solve the above problems and an object of the present invention is to provide an automotive dynamoelectric machine that can improve mounting and removal workability of a protective cover relative to a casing and that can suppress increases in diameter of the casing.

In order to achieve the above object, according to one aspect of the present invention, there is provided an automotive dynamoelectric machine including: a rotor that is rotatably supported inside a casing; a stator including: a stator core; and a stator winding that is mounted to the stator core, the stator being supported by the casing so as to surround the rotor; a rectifying apparatus that is disposed outside a first axial end of the casing, and that rectifies alternating-current electric power that is generated by the stator winding; a voltage regulator that is disposed outside the first axial end of the casing, and that adjusts magnitude of an alternating-current voltage that is generated by the stator; and a resin protective cover that is prepared so as to have a cup shape that is constituted by a floor portion and a tubular peripheral wall portion, and that can be mounted to the casing so as to cover the rectifying apparatus and the voltage regulator. The protective cover includes an engaging hook that includes: a shank portion that is disposed so as to extend from an opening end of the peripheral wall portion; and a hook portion that is disposed so as to project radially outward from a tip end of the shank portion, and the protective cover is held on the casing elastically in an engaged state by the engaging hook being inserted into an engaging aperture that is formed on the casing.

According to the present invention, a hook portion of an engaging hook of the protective cover is disposed so as to project radially outward from a tip end of a shank portion that is disposed so as to extend from an opening end of a peripheral wall portion. Thus, an engaged state between the engaging hook and an engaging aperture that is formed on the casing can be released by elastically deforming radially inward a portion of the peripheral wall portion on which the shank portion is disposed so as to extend. Consequently, because the engaged state between the engaging hook and the engaging aperture can be released without having to use special tools, mounting and removal workability of the protective cover that is mounted to the casing is improved. Because mounting and removal of the protective cover is performed by elastically deforming the shank portion to displace the hook portion radially inward, it is not necessary to form the engaging aperture so as to have an aperture shape that protrudes radially outward from the peripheral wall portion of the protective cover, enabling increases in diameter of the rear bracket to be suppressed.

DETAILED DESCRIPTION OF THE PREFERRED EMBODIMENTS

A preferred embodiment of the automotive dynamoelectric machine according to the present invention will now be explained with reference to the drawings.

Figure 1:
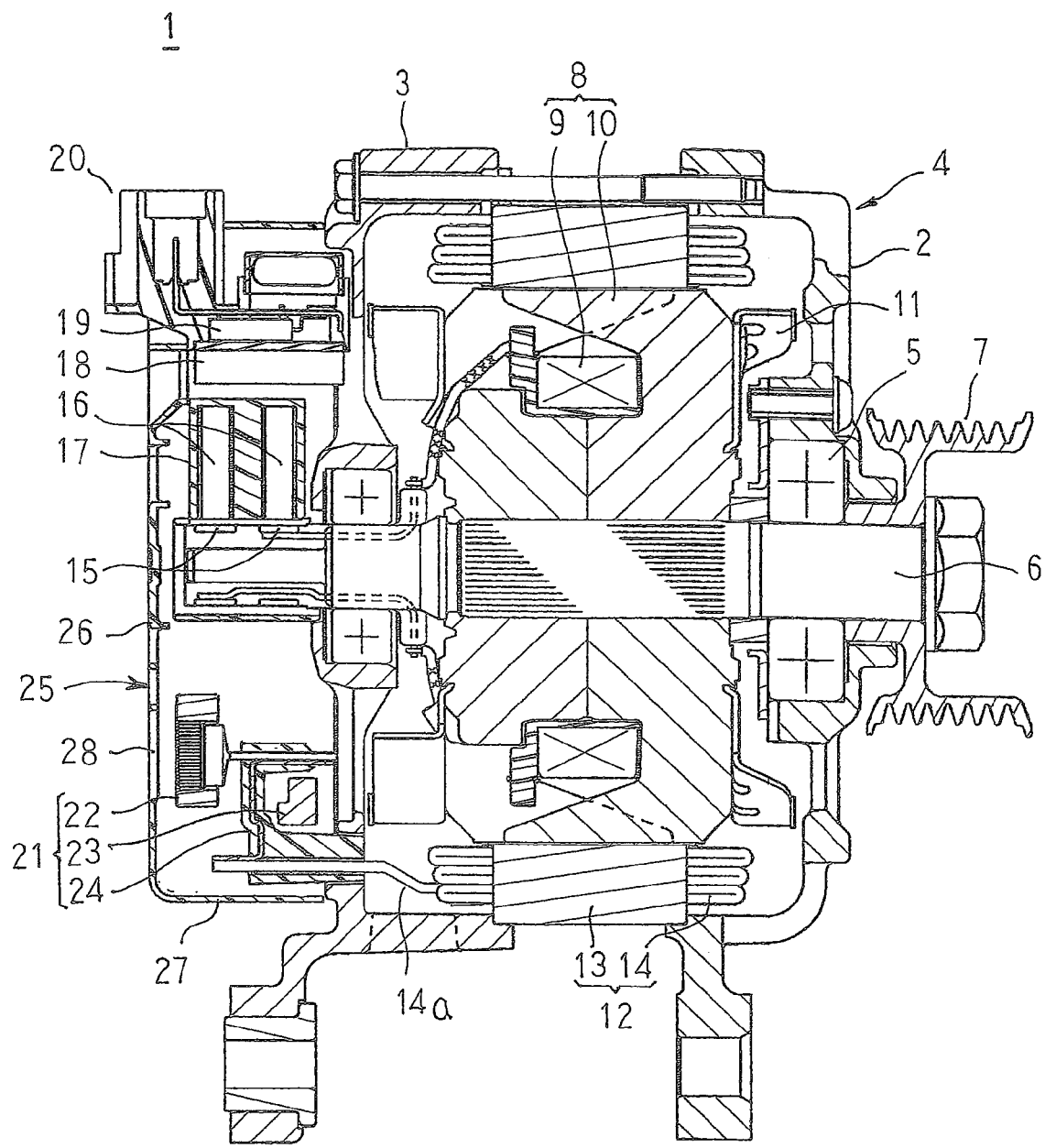
FIG. 1 is a longitudinal cross section that shows an automotive alternator according to a preferred embodiment of the present invention.
Figure 2:
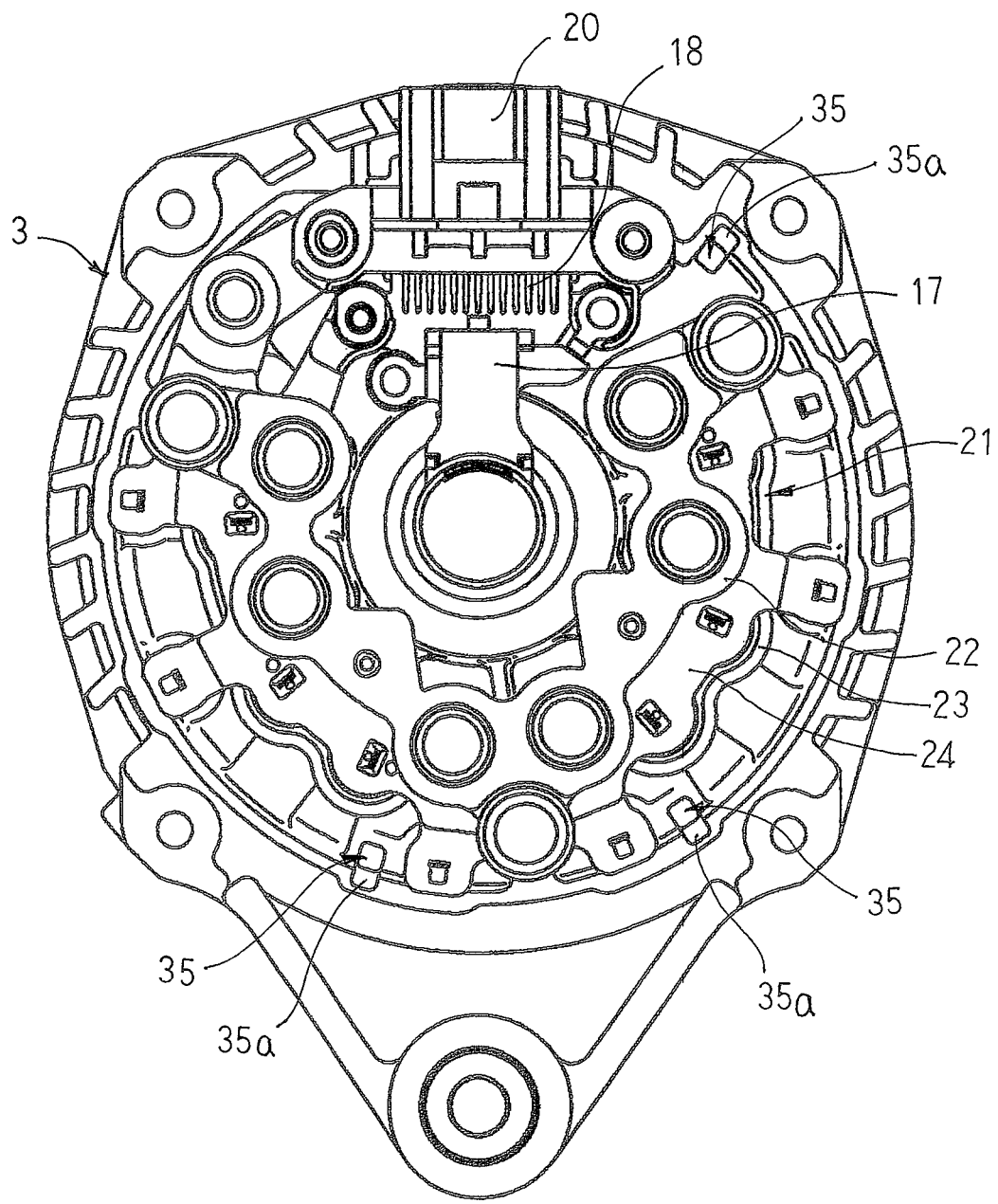
FIG. 2 is a rear-end end elevation that shows a state before mounting a protective cover in the automotive alternator according to the preferred embodiment of the present invention.
Figure 3:
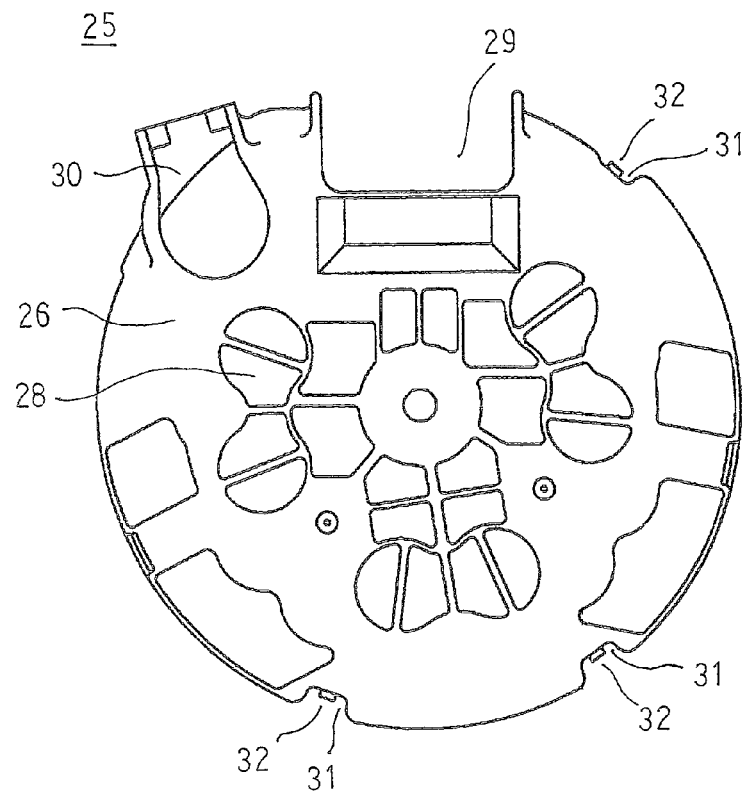
FIG. 3 is a front elevation that shows the protective cover in the automotive alternator according to the preferred embodiment of the present invention.
Figure 4:
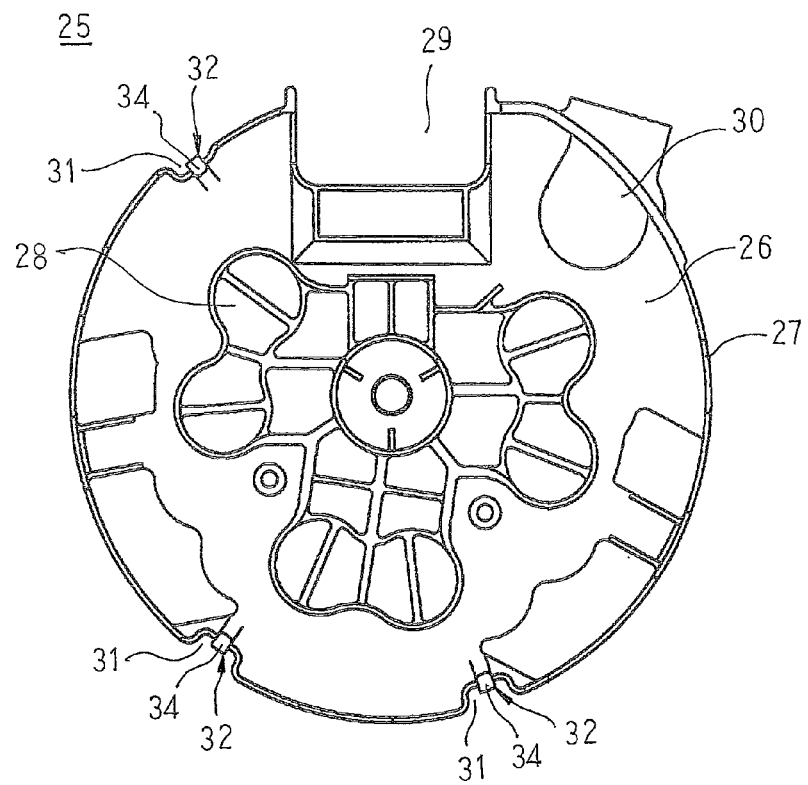
FIG. 4 is a rear elevation that shows the protective cover in the automotive alternator according to the preferred embodiment of the present invention.
Figure 5:
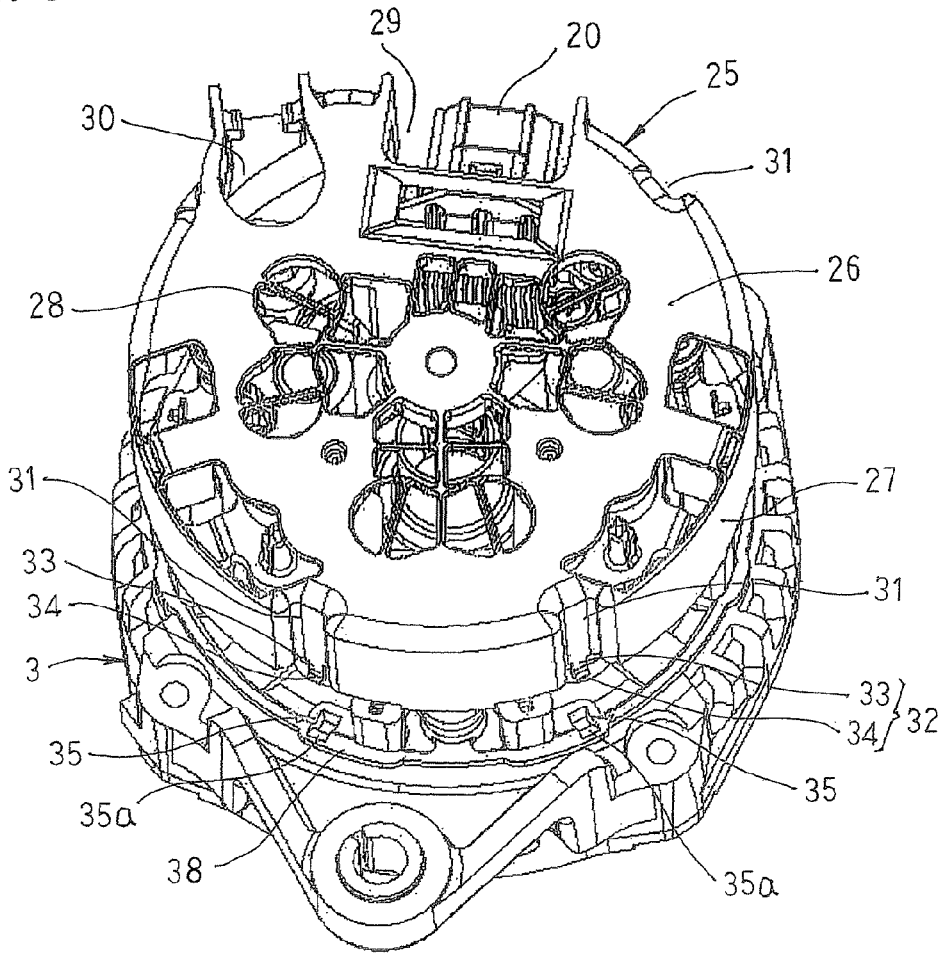
FIG. 5 is a perspective that explains a method for mounting the protective cover in the automotive alternator according to the preferred embodiment of the present invention.
Figure 6:
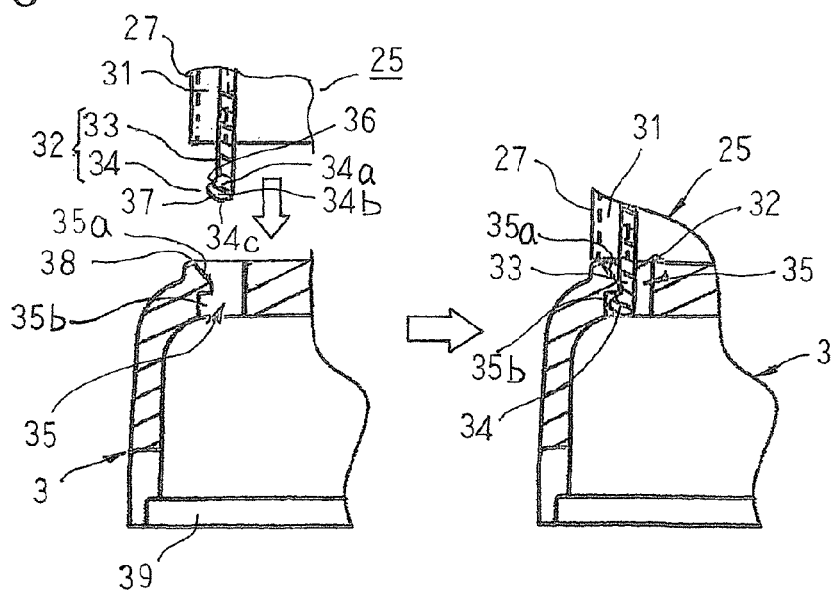
FIG. 6 is a partial cross section that explains a mounted state of the protective cover in the automotive alternator according to the preferred embodiment of the present invention.

FIG. 1 is a longitudinal cross section that shows an automotive alternator according to a preferred embodiment of the present invention, FIG. 2 is a rear-end end elevation that shows a state before mounting a protective cover in the automotive alternator according to the preferred embodiment of the present invention, FIG. 3 is a front elevation that shows the protective cover in the automotive alternator according to the preferred embodiment of the present invention, FIG. 4 is a rear elevation that shows the protective cover in the automotive alternator according to the preferred embodiment of the present invention, FIG. 5 is a perspective that explains a method for mounting the protective cover in the automotive alternator according to the preferred embodiment of the present invention, and FIG. 6 is a partial cross section that explains a mounted state of the protective cover in the automotive alternator according to the preferred embodiment of the present invention.

In FIGS. 1 and 2, an automotive alternator 1 includes: a casing 4 that is constituted by a front bracket 2 and a rear bracket 3 that are each approximately bowl-shaped and made of aluminum; a shaft 6 that is rotatably supported in the casing 4 by means of a pair of bearings 5; a pulley 7 that is fixed to an end portion of the shaft 6 that projects out frontward from the casing 4; a rotor 8 that is fixed to the shaft 6 and that is disposed inside the casing 4; fans 11 that are fixed to two axial end surfaces of the rotor 8; a stator 12 that is fixed to the casing 4 so as to surround the rotor 8; a pair of slip rings 15 that are fixed to a portion of the shaft 6 that projects out rearward from the casing 4 and that supply electric current to the rotor 8; a pair of brushes 16 that slide on respective surfaces of the slip rings 15; a brush holder 17 that accommodates the brushes 16; a voltage regulator 19 that is mounted to a heatsink 18 that is disposed radially outside the brush holder 17, and that adjusts magnitudes of alternating-current voltages that are generated in the stator 12; a connector 20 that is formed integrally with a mount portion of the heatsink 18, and that performs input and output of signals between the voltage regulator 19 and external devices (not shown); a rectifying apparatus 21 that is disposed at the rear end of the rear bracket 3, and that rectifies the alternating-current voltages that are generated in the stator 12 into a direct-current voltage; and a protective cover 25 that is mounted to the rear bracket 3 so as to cover the brush holder 17, the voltage regulator 19, and the rectifying apparatus 21.

The rotor 8 is a Lundell rotor, and includes: a field winding 9 that generates magnetic flux on passage of an excitation current; and a pole core 10 that is disposed so as to cover the field winding 9, and in which magnetic poles are formed by the magnetic flux. The stator 12 includes: a cylindrical stator core 13; and a stator winding 14 that is mounted into the stator core 13, and in which an alternating current is generated by changes in the magnetic flux from the field winding 9 that accompany rotation of the rotor 8. The stator 12 is disposed such that the stator core 13 is held between opening ends of the front bracket 2 and the rear bracket 3 from two axial ends so as to surround the rotor 8.

The rectifying apparatus 21 includes: a positive-side heatsink 22 to which a plurality of positive-side rectifying elements are mounted; a negative-side heatsink 23 to which a plurality of negative-side rectifying elements are mounted; and a circuit board 24, and is configured into an approximate C shape in which the circuit board 24 is inserted between the positive-side heatsink 22 and the negative-side heatsink 23. The positive-side rectifying elements and the negative-side rectifying elements are connected so as to configure a predetermined bridge circuit by means of the circuit board 24.

A rectifying apparatus 21 that has been configured in this manner is fastened to an outer end surface of the rear bracket 3 outside the slip rings 15 so as to be disposed in a fan shape that is centered around the shaft 6 in a plane that is perpendicular to a central axis of the shaft 6. The lead wires 14a of the stator winding 14 are led out through the rear bracket 3 and are connected to terminals of the circuit board 24 to connect the rectifying apparatus 21 and the stator winding 14 electrically. The brush holder 17 is disposed between ends of the approximate C shape of the rectifying apparatus 21, and is fastened to the outer end surface of the rear bracket 3.

Next, configuration of the protective cover 25 will be explained with reference to FIGS. 3 through 6.

The protective cover 25 is molded into a floored cylindrical shape that is constituted by a floor portion 26 and a cylindrical peripheral wall portion 27 using an electrically insulating resin such as polybutylene terephthalate (PBT), nylon 66, etc. A plurality of air intake apertures 28 are formed on the floor portion 26.

A connector outlet aperture 29 is formed by cutting away a portion of the floor portion 26 and the peripheral wall portion 27 of the protective cover 25. An output terminal take-off aperture 30 is formed at a first circumferential end of the connector outlet aperture 29 of the protective cover 25. In addition, three recess portions 31 are each recessed by hollowing a portion of the peripheral wall portion 27 radially inward so as to extend continuously from an opening end of the peripheral wall portion 27 to the floor portion 26. One recess portion 31 is formed at a second circumferential end of the connector outlet aperture 29 of the protective cover 25. The two remaining recess portions 31 are formed on an opposite side from the connector outlet aperture 29 so as to be spaced apart from each other circumferentially.

Engaging hooks 32 are constituted by: shank portions 33 that are disposed so as to extend in groove directions of the recess portions 31 from opening ends of the peripheral wall portion 27 at circumferentially central positions of each of the recess portions 31; and hook portions 34 that are disposed so as to project radially outward from the peripheral wall portion 27 from tip ends of the shank portions 33. Here, portions of root portions 34a of the hook portions 34 that face radially outward are formed so as to have inclined surfaces 36 that displace radially outward sharply toward tip ends 34c. Portions of tip end portions 34b of the hook portions 34 that face radially outward are formed so as to have inclined surfaces 37 that gradually displace radially inward toward the tip ends 34c. Directions of projection of the shank portions 33 from the opening ends of the peripheral wall portion 27 are aligned approximately with the axial direction of the shaft 6 when the protective cover 25 is mounted onto the rear bracket 3.

Moreover, as shown in FIGS. 5 and 6, engaging apertures 35 are formed on an outer circumferential edge portion 38 of the rear bracket 3 so as to correspond to each of the engaging hooks 32. Portions of the inner wall surfaces of each of the engaging apertures 35 that face radially inside the rear bracket 3 are formed so as to have aperture shapes that have: inclined surface portions 35a that gradually displace radially inward toward the opening 39 of the bracket 3 from an outer end surface of the rear bracket 3; and step portions 35b that displace radially outward in a stepped shape toward the opening of the bracket 3 from the inclined surface portions 35a.

In contrast to the casing 4 that bears support of the rotor 8 and installation and support of the automotive alternator 1 on the engine, because a resin protective cover 25 that is configured in this manner assumes a function of protecting parts such as the voltage regulator 19 and the rectifying apparatus 21, etc., that have been disposed outside the casing 4 from exposure to moisture and adhesion of foreign matter, the resin protective cover 25 does not require high rigidity, and is prepared so as to have a thickness that enables elastic deformation.

Next, to mount the protective cover 25 to the rear bracket 3, as shown in FIG. 5, the opening end is oriented toward the rear bracket 3 and the engaging hooks 32 are matched up with the engaging apertures 35. Next, as shown in FIG. 6, the protective cover 25 is moved toward the rear bracket 3, and the engaging hooks 32 are inserted into the engaging apertures 35. The hook portions 34 of the engaging hooks 32 contact the inclined surface portions 35a of the engaging apertures 35, slide on the inclined surface portions 35a of the engaging apertures 35 while elastically deforming the shank portions 33 radially inward, and are inserted into the engaging apertures 35. Then, when the hook portions 34 pass the inclined surface portions 35a, the shank portions 33 return to their original state, and the hook portions 34 project into the step portions 35b. The engaging hooks 32 and the engaging apertures 35 are thereby coupled by snap-fitting, and the protective cover 25 is held on the rear bracket 3.

Here, the inclined surfaces of the root portions of the hook portions 34 are pushed against corner portions near the inclined surface portions 35a of the step portions 35b by the restoring forces of the shank portions 33, generating forces that pull the protective cover 25 toward the rear bracket 3. The opening end of the protective cover 25 is thereby pushed against the outer circumferential edge portion of the rear bracket 3. Thus, the protective cover 25 is held elastically on the rear bracket 3 in an engaged state, suppressing wobbling of the protective cover 25. The air intake apertures 28 face the heatsink 18 of the voltage regulator 19 and the rectifying elements of the rectifying apparatus 21.

Next, to remove the protective cover 25 from the rear bracket 3, a worker first places a thumb against the recess portion 31 that is positioned at the second circumferential end of the connector outlet aperture 29, and places an index finger and a middle finger against the two recess portions 31 that are positioned on the opposite side from the connector outlet aperture 29. Force is then applied to the thumb, the index finger, and the middle finger to elastically deform the recess portions 31 radially inward. The hook portions 34 thereby displace radially inward, releasing the snap-fit coupling between the hook portions 34 and the engaging apertures 35. The protective cover 25 is then moved axially outward from the shaft 6 and the engaging hooks 32 are pulled out of the engaging apertures 35 to remove the protective cover 25 from the rear bracket 3.

In an automotive alternator 1 that has been configured in this manner, a field current is supplied from a battery (not shown) through the brushes 16 and the slip rings 15 to the field coil 9, generating magnetic flux. North-seeking (N) poles and South-seeking (S) poles are formed alternately in a circumferential direction around a circumference of the pole core 10 by this magnetic flux.

At the same time, rotational torque from an engine is transferred to the shaft 6 by means of a belt (not shown) and the pulley 7, rotating the rotor 8. Thus, rotating magnetic fields are applied to the stator winding 14 in the stator 12, generating electromotive forces in the stator winding 14. The alternating-current electromotive forces that are generated in the stator winding 14 are each rectified into direct current by the rectifying apparatus 21, and magnitudes of output voltages therefrom are adjusted by the voltage regulator 19 and supplied to the battery, and to on-board electrical loads, etc.

The fans 11 rotate together with the rotation of the rotor 8, and external air is sucked into the protective cover 25 through the air intake apertures 28, cools the heatsink 18 and the rectifying elements, and then flows into the rear bracket 3. External air that has flowed to a vicinity of the fans 11 is then deflected centrifugally by the fans 11, cools coil ends of the stator winding 14, and is discharged externally.

Here, the protective cover 25 is mounted to the rear bracket 3 so as to cover the voltage regulator 19 and the rectifying apparatus 21. Thus, airborne objects, etc., will not strike the voltage regulator 19 and the rectifying apparatus 21 directly, suppressing occurrences of damage to the voltage regulator 19 and the rectifying apparatus 21. Exposure of the voltage regulator 19 and the rectifying apparatus 21 to moisture, and adherence of foreign matter to the voltage regulator 19 and the rectifying apparatus 21, etc., are also suppressed.

The air intake apertures 28 face the heatsink 18 of the voltage regulator 19 and the rectifying elements of the rectifying apparatus 21. Thus, external air that has been sucked into the protective cover 25 is supplied directly to the heatsink 19 and the rectifying elements from the air intake apertures 28, cooling the voltage regulator 19 and the rectifying apparatus 21 effectively.

In this embodiment, because the hook portions 34 of the engaging hooks 32 are disposed so as to project outward from the tip ends of the shank portions 33 in this manner, the engaged state between the hook portions 34 and the rear bracket 3 can be released by elastically deforming the portions of the peripheral wall portion 27 on which the engaging hooks 32 are formed radially inward to displace the hook portions 34 radially inward. Consequently, the protective cover 25 can be removed from the rear bracket 3 easily, enabling mounting and removal workability of the protective cover 25 to be improved.

Because the hook portions 34 slide on inclined surface portions 35a of the engaging apertures 35 that face a radially inner side of the rear bracket 3 during mounting and removal of the protective cover 25, the engaging apertures 35 are formed so as to have aperture shapes that protrude radially inward from the peripheral wall portion 27 of the protective cover 25, enabling increases in diameter of the rear bracket 3 to be suppressed.

Because the recess portions 31 are recessed into portions of the peripheral wall portion 27 on which the engaging hooks 32 are formed so as to form hollows radially inward so as to extend continuously from the opening end of the peripheral wall portion 27 to the floor portion 26, the portions of the peripheral wall portion 27 on which the engaging hooks 32 are formed are easily elastically deformed radially inward, further improving mounting and removal workability of the protective cover 25. In addition, because the hook portions 34 do not protrude beyond the outermost circumference of the peripheral wall portion 27, the hook portions 34 will no longer strike anything during handling of the protective cover 25 and be damaged.

Moreover, in the above embodiment, explanation is given for an automotive alternator, but the present invention is not limited to automotive alternators, and similar effects are also exhibited if the present invention is applied to automotive dynamoelectric machines such as automotive electric motors, automotive generator-motors, etc.

In the above embodiment, three engaging hooks are formed on a peripheral wall portion so as to be spaced apart from each other circumferentially, but the number of engaging hooks is not limited to three, provided that there are at least two. In that case, it is desirable for the two engaging hooks to be formed at positions that are approximately symmetrical about a point relative to the center of the protective cover.

In the above embodiment, the peripheral wall portion of the protective cover is formed so as to have a cylindrical shape, but the shape of the peripheral wall portion of the protective cover is not limited to a cylindrical shape, provided that it is a tubular shape that surrounds an outer circumferential side of the rectifying apparatus and the voltage regulator that are mounted to the outer end surface of the rear bracket.

What is claimed is:

1. An automotive dynamoelectric machine comprising:
a rotor that is rotatably supported inside a casing;
a stator comprising:
a stator core; and
a stator winding that is mounted to said stator core,
said stator being supported by said casing so as to surround said rotor;
a rectifying apparatus that is disposed outside a first axial end of said casing, and that rectifies alternating-current electric power that is generated by said stator winding;
a voltage regulator that is disposed outside said first axial end of said casing, and that adjusts magnitude of an alternating-current voltage that is generated by said stator; and
a resin protective cover that is prepared so as to have a cup shape that is constituted by a floor portion and a tubular peripheral wall portion, and that can be mounted to said casing so as to cover said rectifying apparatus and said voltage regulator,
wherein:
said protective cover comprises an engaging hook that comprises:
an elastic shank portion that is disposed so as to extend outwardly from an opening end of said peripheral wall portion; and
a hook portion that is disposed so as to project radially outward from a tip end of said shank portion,
said hook portion comprising a root portion adjacent to said shank portion and a tip portion adjacent to a tip end of said hook portion, and said root portion of said hook portion that faces radially outward being formed so as to have an inclined surface displaced radially outward sharply toward the tip end of said hook portion,
an engaging aperture is formed on an outer circumferential edge portion of said first axial end of said casing, said engaging aperture comprising an inclined surface portion gradually displaced radially inward from an outer end surface of said casing toward an opening of said casing and a step portion displaced radially outward in a stepped shape toward the opening of said casing, and
said protective cover is held on said casing elastically in an engaged state by said engaging hook being inserted into said engaging aperture and said inclined surface of said root portion of said hook portion being pushed against a corner portion near said inclined surface portion of said step portion by a restoring force of said shank portion.

2. The automotive dynamoelectric machine according to claim 1, wherein a recess portion is recessed into a portion of said peripheral wall portion where said engaging hook is formed so as to form a hollow radially inward so as to extend continuously from said opening end of said peripheral wall portion to said floor portion.

* * * * *